US008108687B2

(12) United States Patent
Ellis et al.

(10) Patent No.: US 8,108,687 B2
(45) Date of Patent: Jan. 31, 2012

(54) METHOD AND SYSTEM FOR GRANTING ACCESS TO SYSTEM AND CONTENT

(75) Inventors: Richard Donald Ellis, Carnation, WA (US); Christopher Richard Newcombe, Kirkland, WA (US); Paul David Jones, Renton, WA (US); Derrick Jason Birum, Duvall, WA (US); Harold Michael Dunkle, North Bend, WA (US); Mikel Howard Thompson, Shoreline, WA (US)

(73) Assignee: Valve Corporation, Bellevue, WA (US)

( * ) Notice: Subject to any disclaimer, the term of this patent is extended or adjusted under 35 U.S.C. 154(b) by 559 days.

(21) Appl. No.: 10/317,845

(22) Filed: Dec. 11, 2002

(65) Prior Publication Data

US 2003/0221112 A1    Nov. 27, 2003

Related U.S. Application Data

(60) Provisional application No. 60/341,079, filed on Dec. 12, 2001.

(51) Int. Cl.
*G06F 12/14* (2006.01)
*G06F 7/04* (2006.01)
*G06F 17/30* (2006.01)

(52) U.S. Cl. ............................ 713/189; 726/28; 726/29
(58) Field of Classification Search .................. 713/189; 726/28, 29
See application file for complete search history.

(56) References Cited

U.S. PATENT DOCUMENTS

| 2,331,814 A | 10/1943 | Taylor |
| 4,310,720 A * | 1/1982 | Check, Jr. ...................... 713/155 |
| 4,920,487 A | 4/1990 | Baffes |
| 4,999,766 A | 3/1991 | Peters et al. |
| 5,305,389 A | 4/1994 | Palmer |
| 5,325,526 A | 6/1994 | Cameron et al. |
| 5,343,526 A * | 8/1994 | Lassers ........................... 705/59 |
| 5,349,643 A * | 9/1994 | Cox et al. ....................... 713/155 |
| 5,495,533 A | 2/1996 | Linehan et al. ................. 380/21 |
| 5,535,276 A | 7/1996 | Ganesan ......................... 380/25 |
| 5,606,693 A | 2/1997 | Nilsen et al. |

(Continued)

FOREIGN PATENT DOCUMENTS

EP    0841615    5/1998

(Continued)

OTHER PUBLICATIONS

Microsoft Corporation, Microsoft Windows 2000 Server Operating System, "Wndows 2000 Kerberos Authentication," White Paper, 46 pages (1999).

(Continued)

*Primary Examiner* — Michael Pyzocha
(74) *Attorney, Agent, or Firm* — Frommer Lawrence & Haug LLP; Jamie L. Wiegand

(57) ABSTRACT

A method and system for granting access to system and content is provided. A key is provided that allows access by a client computer to content that includes a plurality of resources. A server is accessed and the key is provided to the server. Based on the key, access is granted to the content. A program on the client computer requests a resource of the plurality of resources. If the resource is located locally, the resource is provided to the program. Otherwise, the resource is downloaded from the content server and stored locally. A data structure is modified to indicate that the resource is stored locally and the resource is provided to the program.

19 Claims, 7 Drawing Sheets

U.S. PATENT DOCUMENTS

| | | | |
|---|---|---|---|
| 5,613,089 A * | 3/1997 | Hornbuckle | 711/164 |
| 5,619,716 A | 4/1997 | Nonaka et al. | |
| 5,634,107 A | 5/1997 | Yumoto et al. | |
| 5,732,275 A | 3/1998 | Kullick et al. | |
| 5,737,495 A | 4/1998 | Adams et al. | |
| 5,742,829 A | 4/1998 | Davis et al. | |
| 5,757,919 A | 5/1998 | Herbert et al. | |
| 5,764,992 A | 6/1998 | Kullick et al. | |
| 5,802,292 A | 9/1998 | Mogul | |
| 5,808,690 A | 9/1998 | Rich | |
| 5,819,082 A | 10/1998 | Marion | |
| 5,829,001 A | 10/1998 | Li et al. | |
| 5,835,601 A | 11/1998 | Shimbo et al. | |
| 5,850,535 A | 12/1998 | Maystrovsky et al. | |
| 5,862,339 A | 1/1999 | Bonnaure et al. | |
| 5,915,112 A | 6/1999 | Boutcher | |
| 5,924,094 A | 7/1999 | Sutter et al. | |
| 5,926,624 A | 7/1999 | Katz et al. | |
| 5,933,835 A | 8/1999 | Adams et al. | |
| 5,960,189 A | 9/1999 | Stupek, Jr. et al. | |
| 5,970,143 A * | 10/1999 | Schneier et al. | 713/181 |
| 5,982,893 A | 11/1999 | Hughes | |
| 5,987,376 A * | 11/1999 | Olson et al. | 701/201 |
| 5,999,740 A | 12/1999 | Rowley | |
| 6,009,528 A | 12/1999 | Teraoka | |
| 6,018,717 A * | 1/2000 | Lee et al. | 705/13 |
| 6,029,175 A | 2/2000 | Chow et al. | |
| 6,105,074 A * | 8/2000 | Yokote | 719/328 |
| 6,119,203 A | 9/2000 | Snyder et al. | |
| 6,119,235 A | 9/2000 | Vaid et al. | |
| 6,122,372 A | 9/2000 | Hughes | |
| 6,122,657 A | 9/2000 | Hoffman, Jr. et al. | |
| 6,128,712 A | 10/2000 | Hunt et al. | |
| 6,154,767 A | 11/2000 | Altschuler et al. | |
| 6,195,622 B1 | 2/2001 | Altschuler et al. | |
| 6,219,793 B1 | 4/2001 | Li et al. | |
| 6,223,166 B1 | 4/2001 | Kay | |
| 6,256,773 B1 | 7/2001 | Bowman-Amuah | |
| 6,269,400 B1 | 7/2001 | Douglas et al. | |
| 6,292,465 B1 | 9/2001 | Vaid et al. | |
| 6,292,889 B1 | 9/2001 | Fitzgerald et al. | |
| 6,298,385 B1 * | 10/2001 | Sparks et al. | 709/233 |
| 6,314,409 B2 * | 11/2001 | Schneck et al. | 705/54 |
| 6,317,786 B1 | 11/2001 | Yamane et al. | |
| 6,324,578 B1 | 11/2001 | Cox et al. | |
| 6,332,198 B1 | 12/2001 | Simons et al. | |
| 6,338,072 B1 | 1/2002 | Durand et al. | |
| 6,351,775 B1 | 2/2002 | Yu | |
| 6,366,947 B1 | 4/2002 | Kavner | |
| 6,381,742 B2 | 4/2002 | Forbes et al. | |
| 6,397,258 B1 | 5/2002 | Tsuji et al. | |
| 6,430,608 B1 | 8/2002 | Shaio | |
| 6,438,141 B1 | 8/2002 | Hanko et al. | |
| 6,438,559 B1 | 8/2002 | White et al. | |
| 6,453,353 B1 | 9/2002 | Win et al. | |
| 6,466,979 B1 | 10/2002 | Plouffe, Jr. | |
| 6,473,793 B1 | 10/2002 | Dillon et al. | |
| 6,487,455 B1 | 11/2002 | Balasubramanian | |
| 6,487,659 B1 * | 11/2002 | Kigo et al. | 713/168 |
| 6,505,255 B1 | 1/2003 | Akatsu et al. | |
| 6,546,554 B1 * | 4/2003 | Schmidt et al. | 717/176 |
| 6,578,054 B1 | 6/2003 | Hopmann et al. | |
| 6,578,102 B1 | 6/2003 | Batchelor et al. | |
| 6,584,568 B1 * | 6/2003 | Dircks et al. | 726/2 |
| 6,611,812 B2 * | 8/2003 | Hurtado et al. | 705/26 |
| 6,618,810 B1 * | 9/2003 | Dirie | 726/27 |
| 6,675,382 B1 | 1/2004 | Foster | |
| 6,678,700 B1 | 1/2004 | Moore et al. | |
| 6,684,396 B1 | 1/2004 | Brittain et al. | |
| 6,694,450 B1 | 2/2004 | Kidder et al. | |
| 6,697,378 B1 | 2/2004 | Patel | |
| 6,711,593 B1 | 3/2004 | Gordon et al. | |
| 6,718,549 B1 | 4/2004 | Narin et al. | |
| 6,721,786 B1 | 4/2004 | Gordon et al. | |
| 6,735,601 B1 * | 5/2004 | Subrahmanyam | 707/200 |
| 6,738,970 B1 | 5/2004 | Kruger et al. | |
| 6,748,470 B2 | 6/2004 | Goldick | |
| 6,751,608 B1 | 6/2004 | Cohen et al. | |
| 6,752,313 B1 * | 6/2004 | Caviles et al. | 235/375 |
| 6,754,821 B1 * | 6/2004 | Berson et al. | 713/170 |
| 6,766,428 B2 | 7/2004 | Saulsbury et al. | |
| 6,771,290 B1 | 8/2004 | Hoyle | |
| 6,775,704 B1 | 8/2004 | Watson et al. | |
| 6,795,435 B1 | 9/2004 | Jouppi et al. | |
| 6,799,276 B1 | 9/2004 | Belissent | |
| 6,807,542 B2 * | 10/2004 | Bantz et al. | 707/9 |
| 6,829,649 B1 | 12/2004 | Shorey et al. | |
| 6,848,028 B1 | 1/2005 | Sugumar et al. | |
| 6,862,616 B1 | 3/2005 | Tompkins | |
| 6,868,539 B1 | 3/2005 | Travison et al. | |
| 6,871,344 B2 | 3/2005 | Grier et al. | |
| 6,871,345 B1 | 3/2005 | Crow et al. | |
| 6,880,086 B2 | 4/2005 | Kidder et al. | |
| 6,883,168 B1 | 4/2005 | James et al. | |
| 6,895,506 B1 | 5/2005 | Abu-Husein | |
| 6,912,520 B2 | 6/2005 | Hankin et al. | |
| 6,930,984 B1 | 8/2005 | Nomura et al. | |
| 6,938,005 B2 | 8/2005 | Iverson et al. | |
| 6,950,523 B1 | 9/2005 | Brickell et al. | |
| 6,961,341 B1 | 11/2005 | Krishnan | |
| 6,981,070 B1 | 12/2005 | Luk et al. | |
| 6,986,133 B2 | 1/2006 | O'Brien et al. | |
| 6,996,599 B1 | 2/2006 | Anders et al. | |
| 7,000,230 B1 | 2/2006 | Murray et al. | |
| 7,016,877 B1 * | 3/2006 | Steele et al. | 705/50 |
| 7,035,943 B2 | 4/2006 | Yamane et al. | |
| 7,055,027 B1 | 5/2006 | Gunter et al. | |
| 7,058,607 B1 * | 6/2006 | Miyawaki et al. | 705/52 |
| 7,131,111 B2 | 10/2006 | Passanisi | |
| 7,143,143 B1 * | 11/2006 | Thompson | 709/217 |
| 7,243,226 B2 | 7/2007 | Newcombe et al. | |
| 7,269,854 B2 * | 9/2007 | Simmons et al. | 726/29 |
| 7,301,944 B1 * | 11/2007 | Redmond | 370/390 |
| 7,350,076 B1 | 3/2008 | Young et al. | |
| 7,350,231 B2 * | 3/2008 | Madison et al. | 726/10 |
| 2001/0037313 A1 * | 11/2001 | Lofgren et al. | 705/67 |
| 2001/0044850 A1 | 11/2001 | Raz et al. | |
| 2001/0051928 A1 * | 12/2001 | Brody | 705/52 |
| 2002/0029244 A1 | 3/2002 | Suzuki et al. | |
| 2002/0035526 A1 * | 3/2002 | Kutaragi et al. | 705/34 |
| 2002/0035604 A1 * | 3/2002 | Cohen et al. | 709/205 |
| 2002/0040308 A1 * | 4/2002 | Hasegawa et al. | 705/5 |
| 2002/0049580 A1 * | 4/2002 | Kutaragi et al. | 704/1 |
| 2002/0059408 A1 | 5/2002 | Pattabhiraman et al. | |
| 2002/0075844 A1 | 6/2002 | Hagen | |
| 2002/0083178 A1 | 6/2002 | Brothers | |
| 2002/0083183 A1 * | 6/2002 | Pujare et al. | 709/231 |
| 2002/0087717 A1 * | 7/2002 | Artzi et al. | 709/236 |
| 2002/0112178 A1 * | 8/2002 | Scherr | 713/200 |
| 2002/0124093 A1 * | 9/2002 | Nakai | 709/229 |
| 2002/0126846 A1 * | 9/2002 | Multerer et al. | 380/251 |
| 2002/0147929 A1 * | 10/2002 | Rose | 713/201 |
| 2002/0150253 A1 | 10/2002 | Brezak et al. | |
| 2002/0156675 A1 * | 10/2002 | Pedone | 705/13 |
| 2002/0165026 A1 * | 11/2002 | Perkins et al. | 463/42 |
| 2002/0166117 A1 * | 11/2002 | Abrams et al. | 717/177 |
| 2002/0169876 A1 * | 11/2002 | Curie et al. | 709/226 |
| 2002/0172222 A1 | 11/2002 | Ullmann et al. | |
| 2003/0009365 A1 | 1/2003 | Tynan et al. | |
| 2003/0039211 A1 | 2/2003 | Hvostov et al. | |
| 2003/0065777 A1 * | 4/2003 | Mattila et al. | 709/225 |
| 2003/0101292 A1 * | 5/2003 | Fisher et al. | 709/328 |
| 2003/0105827 A1 | 6/2003 | Tan et al. | |
| 2004/0177120 A1 | 9/2004 | Kirsch | |
| 2004/0215793 A1 | 10/2004 | Ryan et al. | |
| 2007/0038759 A1 | 2/2007 | Hanson et al. | |

FOREIGN PATENT DOCUMENTS

| | | |
|---|---|---|
| EP | 1150207 | 10/2001 |
| GB | 2348721 | 10/2000 |
| JP | 10171635 | 6/1998 |
| WO | 00/55729 | 9/2000 |
| WO | WO/00/55740 * | 9/2000 |
| WO | 01/25871 | 4/2001 |
| WO | 0161486 | 8/2001 |

OTHER PUBLICATIONS

Supplemental European Search Report mailed Nov. 15, 2007 for European Patent Application 02805593.7, 3 pages.
USPTO, Office Communication mailed Feb. 25, 2009 in U.S. Appl. No. 11/737,677, 13 pages.
USPTO, Notice of Allowance mailed Apr. 3, 2009 in U.S. Appl. No. 10/317,851, 10 pages.
USPTO, Office Communication mailed Apr. 21, 2009 in U.S. Appl. No. 10/319,424, 25 pages.
Office Communication for Korean Patent Application No. 7009170/2004, mailed Sep. 17, 2009 & Translation.
Office Communication for U.S. Appl. No. 10/319,424, mailed Oct. 13, 2009.
International Application No. PCT/US02/39975, filed Dec. 12, 2002; International Preliminary Examination Report dated Oct. 17, 2006.
Agarwal et al., Modular Synchronization in Distributed, Multiversion Database: Version Control and Concurrency Control, 1993, pp. 126-37, IEEE.
Slein et al., Requirements for Distributed Authoring and Versioning on the World Wide Web, 1997, pp. 17-24, IEEE.
Nicola et al., Modeling of Correlated Failures and Community Error Recovery in Multiversion Software, 1990, pp. 350-359, IEEE.
U.S. Appl. No. 10/319,424, filed Dec. 12, 2002; Office Communication mailed Nov. 28, 2005.
U.S. Appl. No. 10/319,424, filed Dec. 12, 2002; Office Communication mailed Jun. 13, 2006.
U.S. Appl. No. 10/319,424, filed Dec. 12, 2002; Office Communication mailed Aug. 29, 2006.
U.S. Appl. No. 10/319,424, filed Dec. 12, 2002; Office Communication mailed Nov. 30, 2006.
U.S. Appl. No. 10/319,424, filed Dec. 12, 2002; Office Communication mailed Jan. 25, 2008.
U.S. Appl. No. 10/319,424, filed Dec. 12, 2002; Office Communication mailed Apr. 30, 2008.
U.S. Appl. No. 10/319,424, filed Dec. 12, 2002; Office Communication mailed Nov. 13, 2008.
U.S. Appl. No. 10/319,424, filed Dec. 12, 2002; Office Communication mailed Mar. 19, 2010.
U.S. Appl. No. 10/319,424, filed Dec. 12, 2002; Office Communication mailed Jun. 9, 2010.
U.S. Appl. No. 10/319,424, filed Dec. 12, 2002; Office Communication mailed Jun. 22, 2010.
U.S. Appl. No. 10/319,424, filed Dec. 12, 2002; Notice of Allowance mailed Oct. 15, 2010.
Jauhari, R. et al., "Priority-Hints: An Algorithm for Priority-Based Buffer Management, " University of Wisconsin, Madison WI, Proceedings of the 16th VLDB Conference, Brisbane, Australia 1990.
Written Opinion for International Patent Application No. PCT/US02/39975 dated May 31, 2006.

* cited by examiner

FIG. 7

| APPLICATION 705 | | | | | |
|---|---|---|---|---|---|
| DISTRIBUTED FILE SYSTEM API 710 | | | | | |
| fread 715 | fopen 720 | ftell 725 | fseek 730 | rewind 735 | fwrite 740 |
| STORAGE SYSTEM 745 | | | | | |

700

METHOD AND SYSTEM FOR GRANTING ACCESS TO SYSTEM AND CONTENT

RELATED APPLICATION

This application is a Utility Patent application based on a previously filed U.S. Provisional Patent application, U.S. Ser. No. 60/341,079 filed on Dec. 12, 2001, the benefit of the filing date of which is hereby claimed under 35 U.S.C. §119(e).

BACKGROUND

In the past, when a user desired to use new software, the user was required to go to a store, purchase the software, and install the software on the user's computer. If after the software was shipped, a bug was found, the user would be required to go to the vendor's website, find where a patch could be obtained, and download and apply the patch.

Today, some software is distributed over the Internet. If the software can be packaged in a small executable, a software vendor may choose to distribute the software over the Internet. Using this model, a user can browse to a vendor's Website, pay for software, and then download the software. This model has problems when the software requires a lot of disk space or when the user has an Internet connection with relatively low bandwidth. For example, with a computer with a 28.8 kilobits per second (Kbs) connection to the Internet, a CD's worth of software (650 Megabytes) would take over 50 hours to download. Even with a 512 Kbs connection, downloading 650 Megabytes of software would take almost three hours—assuming that the connection remained up and delivered its full bandwidth.

If a mechanism were provided for decreasing the amount of time a user was required to wait before accessing content available from a server on the Internet, a world of new marketing opportunities could be realized.

SUMMARY

A method and system for granting access to system and content is provided. A key is provided that allows access by a client computer to content that includes a plurality of resources. A server is accessed and the key is provided to the server. Based on the key, access is granted to the content. A ticket may be used to access the content. A program on the client computer requests a resource of the plurality of resources. If the resource is located locally, the resource is provided to the program. Otherwise, the resource is downloaded from the content server and stored locally. A data structure is modified to indicate that the resource is stored locally and the resource is provided to the program.

According to one aspect of the invention, the key is encoded onto at least one of a coupon, a computer display, a file on a computer, mail, email, a business card, a receipt, a dongle, a USB-style plug, a compact flash memory card, a smart card, and a credit card. The key may be encoded magnetically, on a barcode, and/or with ink. The file may be located on a remote server that is accessible after logging into a remote server.

According to another aspect of the invention, the content includes an application suite and/or a computer game. An indication may be provided that indicates when access to the content will terminate. The program on the client computer that requests a resource may be notified of time remaining before access to the content is terminated.

According to another aspect of the invention, a ticket is provided that is stored locally. The ticket is provided to a content server before downloading a resource. The content server may authenticate that at least some of the content of the ticket has not been altered.

According to another aspect of the invention, the key is associated with at least one of a smart card and a credit card. The key is retrieved upon identification of the smart card and/or credit card. The key may be associated with a username and password. Then the key may be provided upon receiving the username and password.

According to another aspect of the invention, a system is disclosed that operates substantially according to the aspects described above.

BRIEF DESCRIPTION OF THE DRAWINGS

FIG. 7 shows a mechanism for transparently accessing a file system that may be distributed locally and over a wide area network.

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined by the appended claims.

In the following description, first an environment in which the invention may be practiced is described. Encryption and decryption principles that may be used by embodiments of the invention are then discussed. Then, a mechanism that can be used grant access to content is described. Next, a method by which the mechanism could grant access is discussed. Finally, a mechanism for transparently accessing a file system that might be distributed locally and over a wide area network is described.

Access Granting Mechanism

Figure 4:
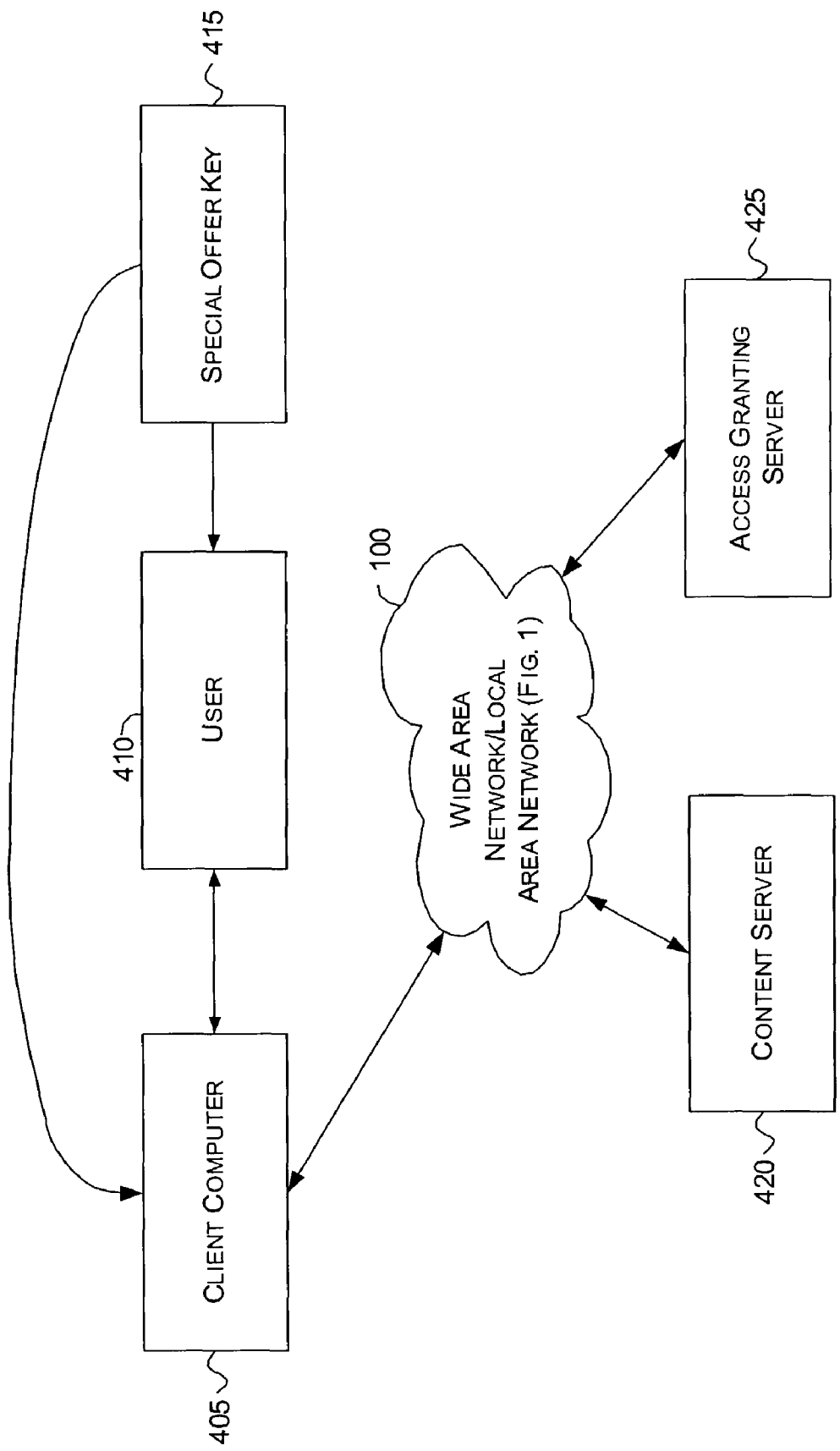
FIG. 4 shows components used in a system for granting access to a system and content.

FIG. 4 shows components used in a system for granting access to a system and content. In one embodiment of the invention, a customer gets a coupon that includes a special offer key allowing the customer to play a selected game or set of games for a period of time. Although the word "game" is used, the special offer key may provide access to other content or services such as an application suite, such as Microsoft® Office. Unless indicated otherwise, "game" is also intended to mean content and/or services. When logging on to a server, for example, the customer provides the key. The server checks the key with a database and determines what games the customer is entitled to access as well as what period of time those games are available.

After a customer uses a special offer key and is authenticated, the customer may have a series of selections to subscribe to. For example, the customer may subscribe to a particular genre of games, such as real time strategy, an application suite, such as Microsoft® Office, or a single game, such as Half-Life®. When a package of software applications is selected, information about the package may be displayed, such as applications included in the subscription. Before, during, and after selecting a package of applications to subscribe to, ads may be displayed on the selection screen. Pricing may be shown telling how much each subscription costs and/or how long the special offer key allows access to a subscription. The subscription follows a customer from computer to computer or other electronic device. When a customer logs on using a computer, the customer obtains a ticket that gives the computer access to one or more content servers that can provide access to files needed to execute the applications contained in the subscription.

After a user is authenticated and uses the special offer key, the user (or the computer the user is using) may be given one or more tickets. Each ticket allows the user to access content on at least one content server. A ticket may be encrypted on a user's electronic device using Pretty Good Privacy (PGP), RSA, AES, or some other encryption technology as mentioned previously. To obtain a ticket, a user may be required to be authenticated. Authentication refers to establishing that an entity is who that entity says he, she, or it is. For example, when asking for a ticket, a user may be required to supply a user name and password. A ticket may then be generated and stored on the electronic device that the user is using to obtain the ticket. The electronic device may then engage in further transactions to obtain one or more tickets for accessing content on content servers. During each of these transactions, a ticket granting server may authenticate the electronic device in addition to determining whether the electronic device has authority to receive a ticket for the requested content. The ticket granting server may ask for the ticket stored on the electronic device both to authenticate the electronic device and to determine what rights to receive content tickets the electronic device has.

Content may be divided into one or more resources. In one sense, a resource is anything a program requires or needs to continue or complete execution. A program itself may be divided into a plurality of resources. When a client computer first requests content, such as a game, the resources of the game may be located solely on a content server. The executable code and data that comprises the game may both be divided into blocks. Each of these blocks could be considered a resource needed by the game to continue or complete execution.

Some of the blocks of executable code of the game may be downloaded from the server and stored on the client computer. After a sufficient number of blocks are downloaded, the game may start executing with the blocks that are currently available on the client computer. Before or when a game comes to a part in the code in which it needs code located on the content server, the game may request a block of code containing the needed code. This block of code would be a resource needed by the game to continue or complete execution.

A resource includes such things as a particular portion of a file. A resource may be identified by information including the name of the file together with an offset in the file and bytes requested. The file may be a data file, a dynamic link library, an executable program, a component, and the like. Resources may also include such things as a processor, memory, a printer, a display adapter, a network adapter, a storage device such as a hard disk, CD-ROM, DVD disk, or other optical disk, and the like, although it will be recognized that these devices would not be downloaded from a content server to a client computer.

In an embodiment of the invention, a third party gives a customer access to content, such as one or more applications, by giving a special offer key to the customer using the Internet. For example, the customer may purchase an item from a merchant's Web site. Sometime during or after the purchasing transaction, the merchant may give the customer the special offer key. This may be done by displaying the key on the customer's Web browser, storing the key in a file on the customer's computer, such as in a cookie, Windows registry, or other file or database, emailing the customer the key, sending the customer the key in the mail, associating the key with a customer's account with the merchant so that the customer can retrieve the key later by logging into his or her account, etc.

In other embodiments of the invention, the special offer key may be included on a business card or a receipt. It may be encoded magnetically, through the use of a bar code, and/or through ink. The key may also be embedded in a physical device such as a dongle, USB-style plug, compact flash memory card, smart card, credit card, and the like. The period of time that each key is good for may be based on when the key is first used, when the key was generated and/or printed, when the customer receives the coupon, and/or a variety of other factors. A key may allow a person to play for minutes, a few hours, a day, a few days, a month, or indefinitely. As the time associated with the key runs out, the user may be asked if he or she would like to renew the key. The frequency of requests to renew a key may increase as the time associated with the key gets closer to expiring. A question to renew a key may occur by displaying a Web page, through displaying a prompt while the customer is using an application associated with the content, through displaying a prompt when the user logs on or at other predetermined times, through sending email messages, banner adds, and the like.

In another embodiment of the invention, when a ticket for content expires, access to the content is cut off. This may be implemented, for example, by file I/O routines on the client that provide access to the content. For example, these routines may track the time remaining and may cut off file I/O after the time has expired. Cutting off access may also be implemented by calling procedures within an application that cause the application to stop functioning until a new ticket is purchased or otherwise obtained.

In an embodiment of the invention, an application programming interface (API) is provided that allows a company to bill customers for usage. For example, the API may provide functions that allow the company to determine how much time a customer has used on each subscription to which the customer has subscribed. The API may also provide a billing company access to customer billing information such as credit card number, telephone number, address, billing options, etc.

A customer may be given many options for purchasing or accessing content. Some illustrative options are as follows:
One Time Fee A customer may have the option of purchasing content by paying a onetime fee. This content may then be delivered over a network and/or physically, such as through a CD-ROM containing the content. A vendor using this distribution model may automatically be charged a certain percentage of each sale made.
Rentals A customer may purchase content on a rental basis. For example, the customer may walk into a store, such as Block- Buster Video, Hollywood Video, or some other store, and purchase a certain amount of time for renting particular content. The store may give the customer a key using any of the methods discussed above, e.g. through a coupon, encoding a key on a receipt or smart card, etc.

Subscription

A customer may subscribe to a service that allows the customer to access content from one or more vendors. The service may automatically bill the customer's credit card, withdraw funds periodically from the user's bank account, send monthly bills to the customer, or charge the client for the service in a variety of other ways. The service may automatically charge a vendor a fee for providing the service. The fee may be based on the value of the services purchased, based on the amount of resources used to provide the service, may be a fixed fee, or any other method appropriate for providing the service. In one embodiment of the invention, a subscriber may be billed monthly for a subscription. In other embodiments of the invention, a subscriber is billed at intervals of time other than or in addition to monthly.

Pre-Paid Usage

A customer may purchase a pre-paid subscription to content. For example, a user may purchase a card containing a predetermined amount of usage based on the fee paid. The user may also pre-pay on the Internet while accessing a site associated with the vendor of the content and participating in a pre-paid plan. The card, or other item associated with the pre-paid content may be recharged.

Promotional Usage.

A merchant may purchase content from or partner with a content provider to provide content to the merchant's customers. For example, a special offer key may be given in a "happy meal" or its equivalent that allows content to be accessed for a period of time. A car salesman's business card may be encoded with a key that allows a customer to access content that simulates the driving of certain cars, such as a Dodge Viper, etc. While accessing the content, advertising regarding the salesman or the dealership may be displayed, for example, in banner ads, in a browser, and/or in the content itself, e.g., on the Dodge Viper. A merchant may be charged for just the period of time that a customer actually accesses the content. For example, a salesperson may distribute business cards with different special offer keys to many individuals. Only a few individuals, however, may actually use the special offer key to access content. The salesperson or dealership may be charged a fee based on the amount of content used, rather than the number of business cards handed out.

FIG. 4 shows components used in a system for granting access to a system and content. It will be recognized that the principles described above could be employed by the components shown in FIG. 4. The system includes client computer 405, user 410, special offer key 415, WAN/LAN 100, content server 420, and access granting server 425. Client computer 405 is coupled to content server 420 and access granting server 425 through WAN/LAN 100. In one embodiment of the invention, content server 420 and access granting server 425 are located on the same server.

Client computer 405 is any device or set of devices that receives input from user 410. An exemplary device performing this function is client computer 300 as described in conjunction with FIG. 3.

Content server 420 is a device or set of devices that provides content. An exemplary device performing this function is server 200 as described in conjunction with FIG. 2 and configured with appropriate software and hardware. Content server 420 may receive a ticket from client computer 405 in conjunction with a request to access content. Content server 420 may authenticate the ticket and/or user in such a request.

Access granting server 425 is a device or set of devices that provide access to content server 420. An exemplary device performing this function is server 200 as described in conjunction with FIG. 2 and configured with appropriate software and hardware. Access granting server 425 may receive a key from client computer 405 together with a username and password. Access granting server 425 may authenticate user 410 and determine what rights to access content user 410 is entitled to based on the key provided by user 410.

Arrows are drawn from special offer key 415 to user 410 and client computer 405 to indicate that special offer key 415 may be given to the user and/or client computer 405 as described previously.

In an embodiment of the invention, there may be a grace period after a ticket expires in which to either pay for additional time, to continue using an application, and/or to save the state of an application. A user using the content may be reminded at certain time intervals before the ticket expires to renew the ticket. This may be implemented by a callback routine in an application. A process that is aware of how much time is left on a ticket may periodically call the callback routine to notify the application. The application may then remind the user of the pending expiration of the ticket and solicit renewals of the ticket.

According to another embodiment of the invention, the user is not cut off from the content upon expiration of the ticket. Instead, the quality of the content is degraded. The content quality may be degraded to a predetermined level, or the content quality may be degraded over a period of time.

Tickets may be encrypted on a client computer. When the user logs off the client computer (or logs onto another computer), tickets on the client computer associated with that user may be deleted or expired.

Flow Charts

Figure 5:
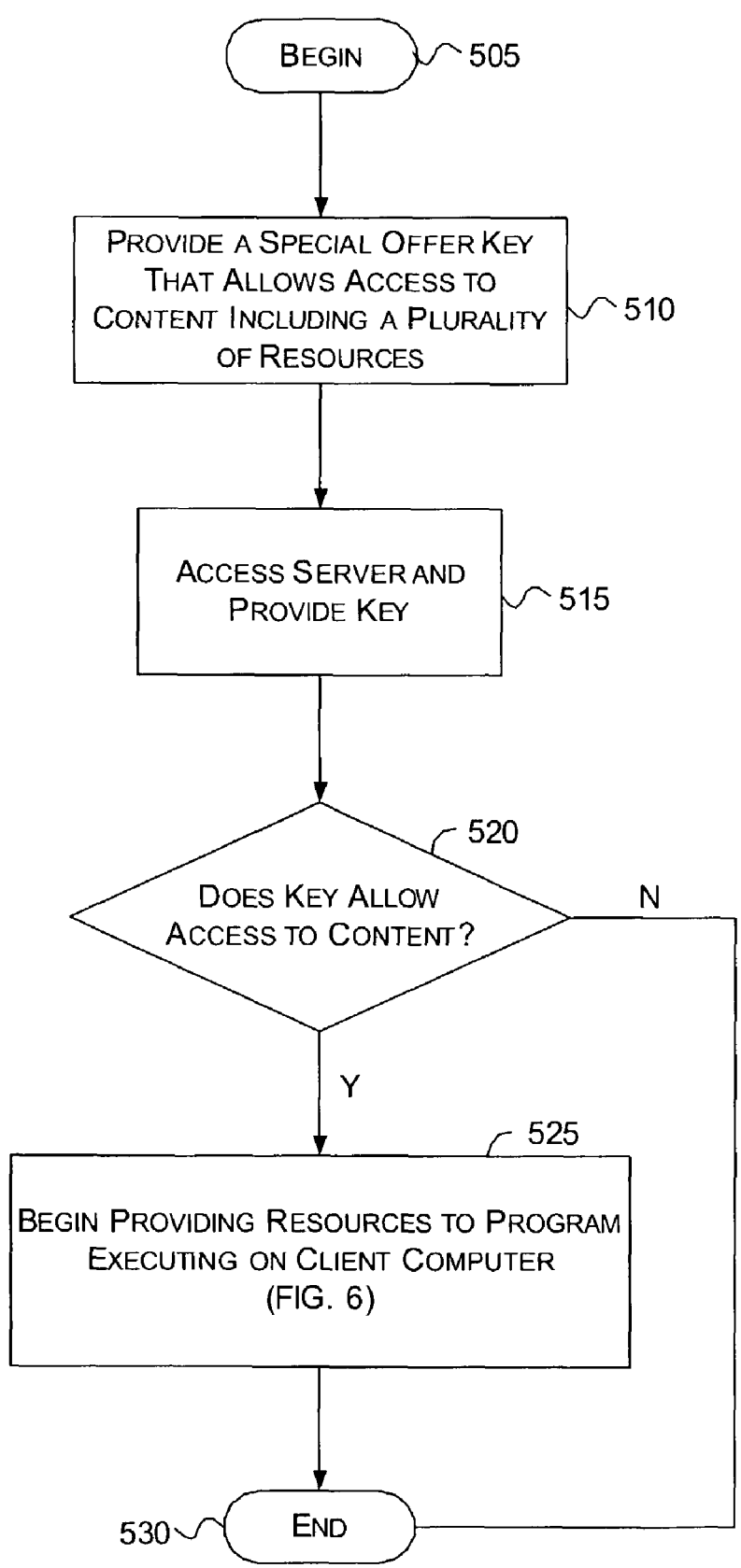
FIG. 5 shows a flowchart illustrating a method used in granting access to a system and content.

FIG. 5 shows a flowchart illustrating a method used in granting access to a system and content. The process begins at block 505 when special offer key is available to be provided. After block 505, processing continues at block 510.

At block 510, a special offer key is provided that allows access to content. As described earlier, the content may include a plurality of resources. For example, referring to FIG. 4, a merchant (not shown) may provide special offer key 415 to user 410. The special offer key may be encoded on, for example, a business card. After block 510, processing continues at block 515.

At block 515, a server is accesses and the special offer key is provided to the server. For example, referring to FIG. 4, user 410 utilizes computer 405 to provide the offer key previously received to access granting server 425. After block 515, processing continues at block 520.

At block 520, a determination is made as to whether the key allows access to the content requested. If not, processing continues at block 530; otherwise, processing continues at block 525. For example, the key may allow access to game that allows the user to test drive a car. If this is what is requested, access to the content associated with the game can be provided.

At block 525, resources associated with the content are provided to a program executing on the client computer. For example, referring to FIG. 4, client computer 405 begins requesting resources for the game from content server 420. This process is described in more detail in conjunction with FIG. 5. After block 525, processing continues to block 530.

At block 530, processing ends. At this point, a special offer key was provided that allowed access to content. A server was accessed and the key provided to the server. The server determined whether the key allowed access to the content requested. If so, a process of providing the resources associated with the content was initiated. The process above could be repeated each time an entity desired to provide access to content through the use of a special offer key.

Figure 6:
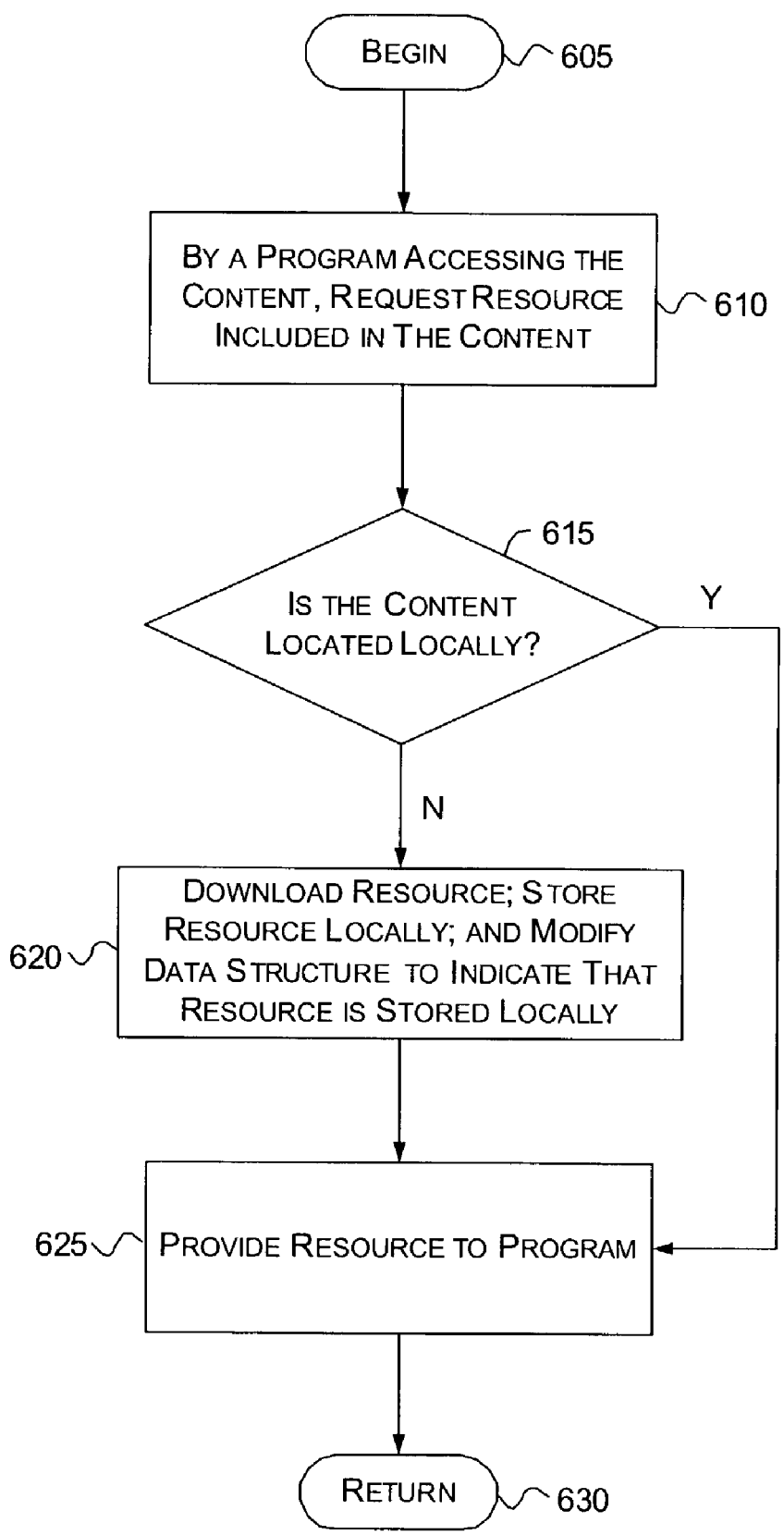
FIG. 6 shows a flowchart illustrating a method that could be used in providing resources associated with content.

FIG. 6 shows a flowchart illustrating a method that could be used in providing resources associated with content. The process begins at block 605 after it is desired to provide resources to a program executing on a client computer. After block 605, processing continues at block 610.

At block 610, a resource that is part of the content for which access has been granted is requested by a program accessing the content. For example, a game may begin executing after it has received a few of its resources. It may then come to a point where it needs another resource to continue execution. For example, in a game with levels, a player may go to a new level for which resources have not yet been downloaded. The program accessing the content, e.g., the game, may request the first resource associated with the new level so that the player can continue playing the game. After block 610, processing continues at block 615.

At block 615, a determination is made as to whether the resource is located locally. If not, processing continues at block 620; otherwise, processing continues at block 625. This determination may be made by a mechanism such as that shown in FIG. 7.

At block 620, the requested resource is downloaded and stored locally. In addition, a data structure is modified to indicate that the resource has been stored locally. After block 620, processing continues at block 625.

At block 625, the resource is proved to the program requesting access to the content. After block 625, processing continues at block 630.

At block 630, processing returns to the calling process. At this point, a request for resource has been received and a determination made as to whether the resource is stored locally or on a content server. If the resource was not stored locally, it was downloaded and stored. Then, the resource was provided to the requesting program. This process may be repeated for each resource requested by a program accessing the content.

Transparent Distributed File Access System

FIG. 7 shows a mechanism for transparently accessing a file system that may be distributed locally and over a wide area network. An embodiment of the invention implements a file system input/output (I/O) API that includes procedures for reading and writing to files in addition to determining properties such as file size, file name, path, etc. The file system may keep track of which files are located locally and which files are not. When the file system API receives a request for a file (or a portion thereof), it may determine whether the data requested is located locally. If the data is located locally, the data may be retrieved from a local storage device and sent to the requestor. If the data is not located locally, the data may be retrieved from a content server. After the data is retrieved from a content server, it may then be stored in a cache file or other file local to a client. In addition, a data structure that indicates that the file (or a portion thereof) is locally accessible may also be updated, so that future requests for the file may be obtained by accessing a local storage device.

Directory structures and file attributes for an application may be stored locally. This may allow, for example, a request about the size of a file or a request for a list of files contained in a directory to be satisfied without sending a request to another device, such as a content server.

In one embodiment of the invention, a software developer may make changes to source code to cause an application to access the distributed file system I/O API. This may be done manually, through macro substitution, or through some other method for changing calls to a regular file system I/O API to a distributed file system I/O API.

In another embodiment of the invention, changes in source code are not required to access a distributed file system I/O API. Rather, the distributed file system I/O API may be given the same interface as a regular file system I/O API. That is, the distributed file system I/O API may include the same functions as the regular file system I/O API. In addition, each function of the distributed file system I/O API may include the same parameters and return the same values as the regular file system I/O API. Then, the distributed file system I/O API may be linked into an application, thereby replacing the regular file system I/O API. When an application makes a call, the distributed file system I/O API may automatically handle retrieving a file from a distributed file system.

One method for replacing these calls is to link in a new set of libraries having functions with different names, such as Resfopen, Resftell, Resfseek, ResFindFirst, ResFindNext, etc. Then, macros may be defined in "C" or in other languages using other mechanisms to facilitate changing all calls to fopen, ftell, etc., to corresponding calls such as Resfopen, Resftell, etc. Then, a software developer wishing to make a distributed file system transparent may recompile his or her software and link in the replacement libraries.

An embodiment of the invention replaces an input/output (I/O) library with a new library. For example, the I/O library of the "C" or "C++" language (or any other language) may be replaced or augmented with another library that logs resource requests. In particular, the I/O functions of the "C" language contained in the "C" standard library (stdlib), e.g., fopen, ftell, fseek, fwrite, etc., may be replaced or augmented with functions that log information about the file accesses. In addition Windows specific functions, such as FindFirstFile (a function that returns the first file in a file list), FindNextFile (a function that returns the next file in a file list), and other file access functions may be replaced with calls that also log information about the file accesses. One method for replacing these calls is to link in a new set of libraries having functions with different names, such as ResLogfopen, ResLogftell, ResLogfseek, ResLogFindFirst, ResLogFindNext, etc. Then, macros may be defined in "C" or in other languages using other mechanisms to facilitate changing all calls to fopen, ftell, etc., to corresponding calls such as ResLogfopen, ResLogftell, etc. Then, a software developer wishing to log resource requests may recompile his or her software and link in the replacement libraries.

In another embodiment of the invention, an interpreter is modified or augmented to recognize file system calls. The interpreter may automatically replace such calls with calls to resource logging procedures. Alternatively, or in addition, the interpreter itself may directly log file resource requests. In addition, manual substitution and/or macro substitution, or its equivalent, may be used to automatically replace one set of functions with another set of functions that logs resource requests.

For example, referring to FIG. 7, the new functions may be found in distributed file system API 710. These functions may also utilize standard I/O functions such as fread 715, fopen 720, ftell 725, fseek 730, rewind 735, fwrite 740, and other I/O functions (not shown). For example, when distributed file system API 710 determines that a resource is contained locally, it may make use of one of the f . . . functions contained in stdlib to access the resource. In addition, for a resource that is not found locally, distributed file system API 710 may first retrieve the resource from a content server and then use one or more of the f . . . functions contained in stdlib to access the resource. In addition, functions in distributed file system AP1 710 may directly access storage system 745 without going through one of the f . . . functions.

Application 705 is a program that requests resources through distributed file system API 710. As discussed previously, some of the resources the application needs or requires to continue execution may be located remotely on, for example, a content server.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit or scope of the present invention.

Illustrative Operating Environment

Figure 1:
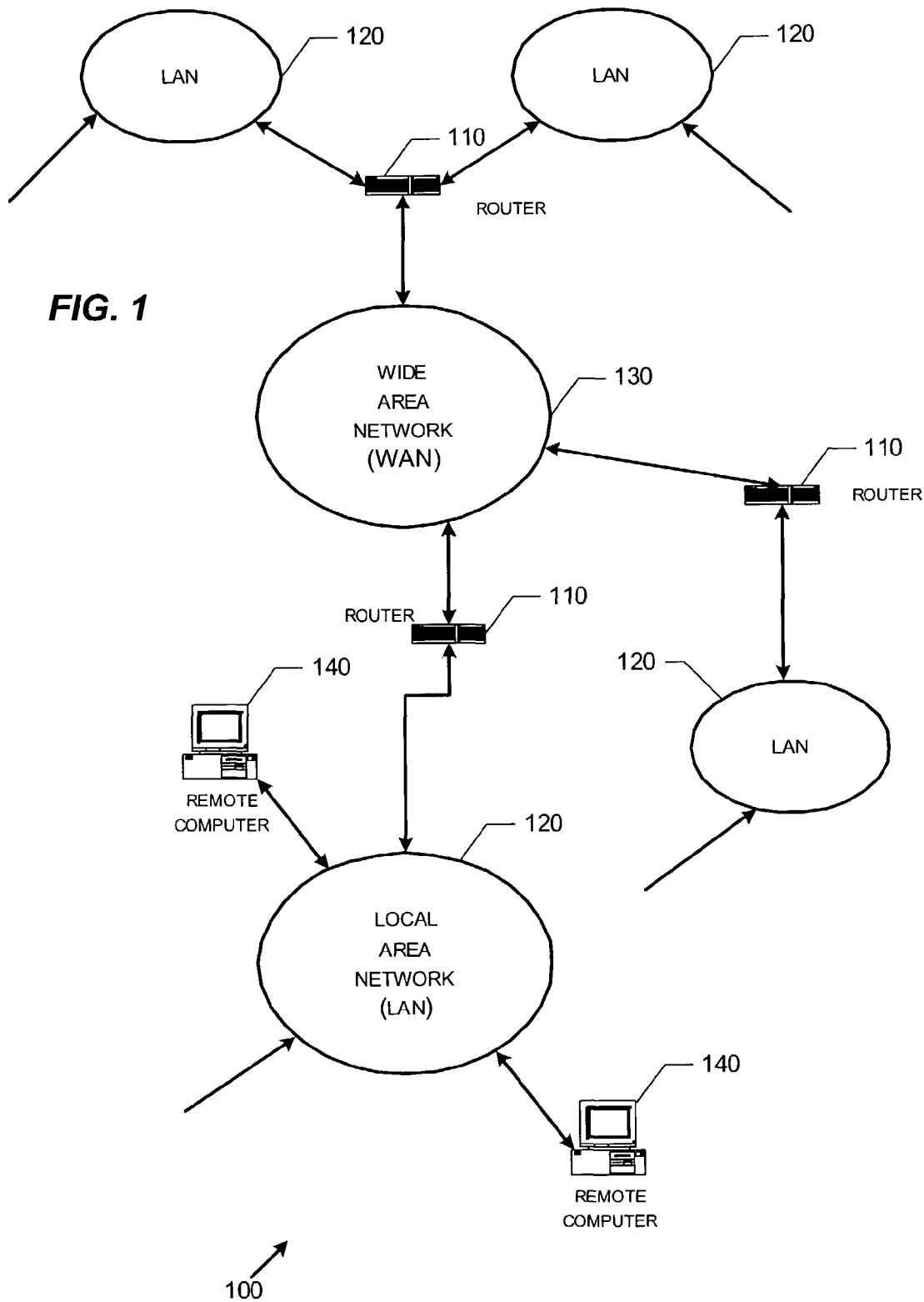
FIGS. 1-3 show components of an exemplary environment in which the invention may be practiced.
Figure 2:
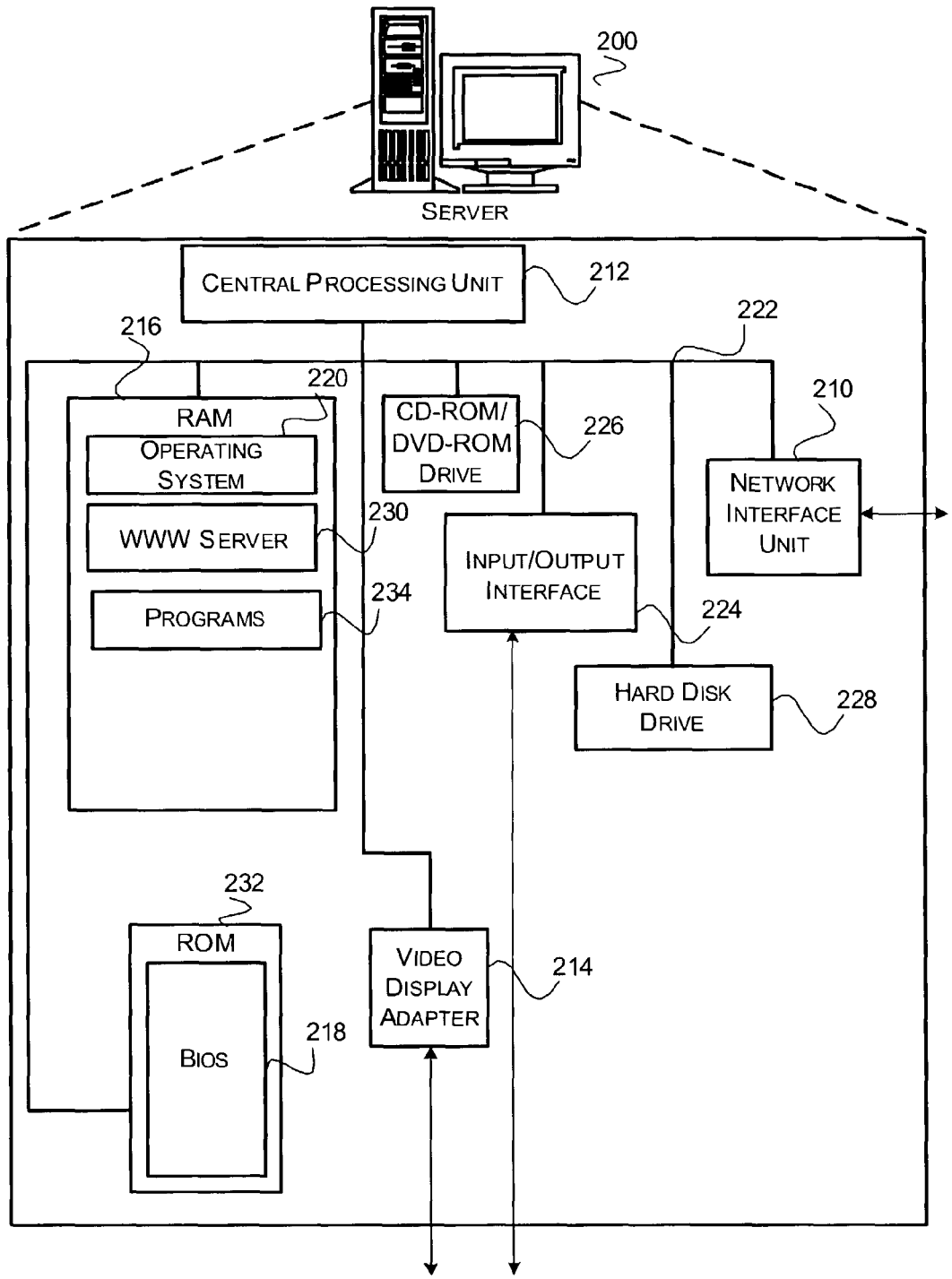
Figure 3:
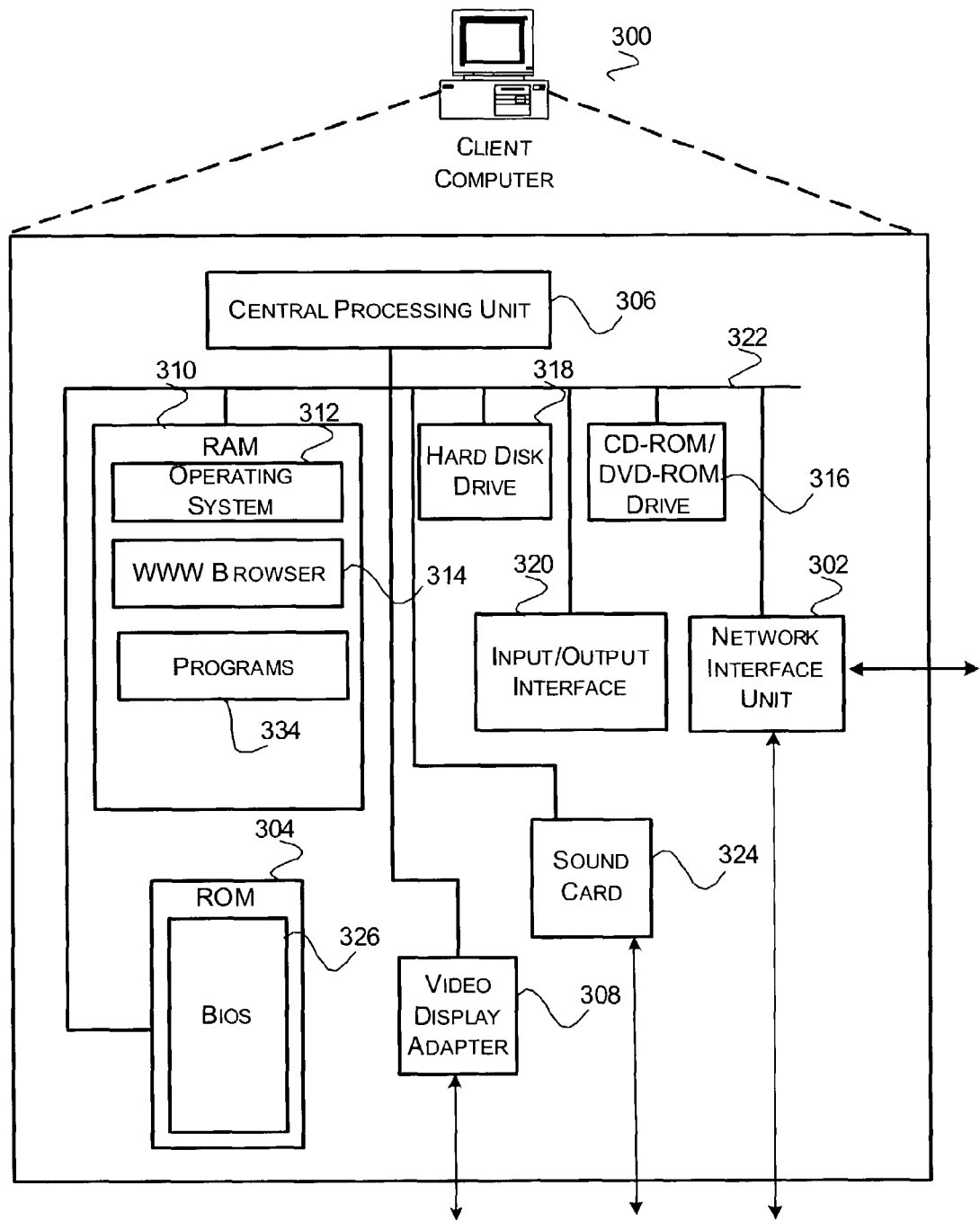

FIGS. 1-3 show components of an exemplary environment in which the invention may be practiced. Not all of the components may be required to practice the invention, and variations in the arrangement and type of the components may be made without departing from the spirit or scope of the invention.

FIG. 1 shows a plurality of local area networks ("LANs") 120 and wide area network ("WAN") 130 interconnected by routers 110. Routers 110 are intermediary devices on a communications network that expedite message delivery. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another. Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known to those skilled in the art. Furthermore, computers, such as remote computer 140, and other related electronic devices can be remotely connected to either LANs 120 or WAN 130 via a modem and temporary telephone link. The number of WANs, LANs, and routers in FIG. 1 may be increased or decreased arbitrarily without departing from the spirit or scope of this invention.

As such, it will be appreciated that the Internet itself may be formed from a vast number of such interconnected networks, computers, and routers. Generally, the term "Internet" refers to the worldwide collection of networks, gateways, routers, and computers that use the Transmission Control Protocol/Internet Protocol ("TCP/IP") suite of protocols to communicate with one another. At the heart of the Internet is a backbone of high-speed data communication lines between major nodes or host computers, including thousands of commercial, government, educational, and other computer systems, that route data and messages. An embodiment of the invention may be practiced over the Internet without departing from the spirit or scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

The Internet has recently seen explosive growth by virtue of its ability to link computers located throughout the world. As the Internet has grown, so has the World Wide Web (WWW). Generally, the WWW is the total set of interlinked hypertext documents residing on HTTP (hypertext transport protocol) servers around the world. Documents on the WWW, called pages or Web pages, are typically written in HTML (Hypertext Markup Language) or some other markup language, identified by URLs (Uniform Resource Locators) that specify the particular machine and pathname by which a file can be accessed, and transmitted from server to end user using HTTP. Codes, called tags, embedded in an HTML document associate particular words and images in the document with URLs so that a user can access another file, which may literally be halfway around the world, at the press of a key or the click of a mouse. These files may contain text (in a variety of fonts and styles), graphics images, movie files, media clips, and sounds as well as Java applets, ActiveX controls, or other embedded software programs that execute when the user activates them. A user visiting a Web page also may be able to download files from an FTP site and send messages to other users via email by using links on the Web page.

A server, such as the server shown in FIG. 2, may provide a WWW site, be a content server, a game server, an authentication server, etc. When providing Web pages, the server may have storage facilities for storing hypertext documents for a WWW site and running administrative software for handling requests for the stored hypertext documents. A hypertext document normally includes a number of hyperlinks, i.e., highlighted portions of text which link the document to another hypertext document possibly stored at a WWW site elsewhere on the Internet. Each hyperlink is associated with a URL that provides the location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA programming language from Sun Microsystems, for execution on a remote computer. Likewise, a WWW server may also include facilities for executing scripts and other application programs on the WWW server itself.

A user may retrieve hypertext documents from the WWW via a WWW browser application program located on a wired or wireless device. A WWW browser, such as Netscape's NAVIGATOR® or Microsoft's INTERNET EXPLORER®, is a software application program for providing a graphical user interface to the WWW. Upon request from the user via the WWW browser, the WWW browser accesses and retrieves the desired hypertext document from the appropriate WWW server using the URL for the document and HTTP. HTTP is a higher-level protocol than TCP/IP and is designed specifically for the requirements of the WWW. HTTP is used to carry requests from a browser to a Web server and to transport pages from Web servers back to the requesting browser or client. The WWW browser may also retrieve application programs from the WWW server, such as JAVA applets, for execution on a client computer.

FIG. 2 shows an exemplary server that may operate to provide a WWW site, other content, and/or services, among other things. When providing a WWW site, server 200 transmits WWW pages to the WWW browser application program executing on requesting devices to carry out this process. For instance, server 200 may transmit pages and forms for receiving information about a user, such as address, telephone number, billing information, credit card number, etc. Moreover, server 200 may transmit WWW pages to a requesting device that allow a consumer to participate in a WWW site. The transactions may take place over the Internet, WAN/LAN 100, or some other communications network known to those skilled in the art.

Those of ordinary skill in the art will appreciate that server 200 may include many more components than those shown in FIG. 2. However, the components shown are sufficient to disclose an illustrative environment for practicing the present invention. As shown in FIG. 2, server 200 is connected to WAN/LAN 100, or other communications network, via network interface unit 210. Those of ordinary skill in the art will appreciate that network interface unit 210 includes the necessary circuitry for connecting server 200 to WAN/LAN 100, and is constructed for use with various communication protocols including the TCP/IP protocol. Typically, network interface unit 210 is a card contained within server 200.

Server 200 also includes processing unit 212, video display adapter 214, and a mass memory, all connected via bus 222. The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores operating system 220 for controlling the operation of server 200. It will be appreciated that this component may comprise a general purpose server operating system as is known to those of ordinary skill in the art, such as UNIX, LINUX™, or Microsoft WINDOWS NT®. Basic input/output system ("BIOS") 218 is also provided for controlling the low-level operation of server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a WWW site. More specifically, the mass memory may store applications including WWW server application program 230, and programs 234. WWW server application program 230 includes computer executable instructions which, when executed by server 200, generate WWW browser displays, including performing the logic described above. Server 200 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with an external security application to send and receive sensitive information, such as credit card information, in a secure fashion.

Server 200 also comprises input/output interface 224 for communicating with external devices, such as a mouse, keyboard, scanner, or other input devices not shown in FIG. 2. Likewise, server 200 may further comprise additional mass storage facilities such as optical drive 226 and hard disk drive 228. Hard disk drive 228 is utilized by server 200 to store, among other things, application programs, databases, and program data used by WWW server application program 230. For example, customer databases, product databases, image databases, and relational databases may be stored.

FIG. 3 depicts several components of client computer 300. Those of ordinary skill in the art will appreciate that client computer 300 may include many more components than those shown in FIG. 3. However, it is not necessary that those conventional components be shown in order to disclose an illustrative embodiment for practicing the present invention. As shown in FIG. 3, client computer 300 includes network interface unit 302 for connecting to a LAN or WAN, or for connecting remotely to a LAN or WAN. Those of ordinary skill in the art will appreciate that network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point-to-point protocol ("PPP") connection or a serial line Internet protocol ("SLIP") connection as known to those skilled in the art.

Client computer 300 also includes BIOS 326, processing unit 306, video display adapter 308, and memory. The memory generally includes RAM 310, ROM 304, and a permanent mass storage device, such as a disk drive. The memory stores operating system 312 and programs 334 for controlling the operation of client computer 300. The memory also includes WWW browser 314, such as Netscape's NAVIGATOR® or Microsoft's INTERNET EXPLORER® browsers, for accessing the WWW. It will be appreciated that these components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. Input/output interface 320 may also be provided for receiving input from a mouse, keyboard, or other input device. The memory, network interface unit 302, video display adapter 308, and input/output interface 320 are all connected to processing unit 306 via bus 322. Other peripherals may also be connected to processing unit 306 in a similar manner.

As will be recognized from the discussion below, aspects of the invention may be embodied on server 200, on client computer 300, or on some combination thereof. For example, programming steps may be contained in programs 334 and/or programs 234.

In this disclosure, references will be made to client and server. Where appropriate, client should be construed to refer to a process or set of processes that execute on one or more electronic device, such as client computer 300 of FIG. 3. A client is not limited, however, to running on a client computer. It may also run on a server, such as WWW server 200 or be distributed among various electronic devices, wherein each device might contain one or more processes or routines that together constitute a client application. Where appropriate, client should be construed, in addition or in lieu of the discussion above, to be a device upon which one or more client processes execute, for example, client computer 300 or WWW server 200.

Similarly, server should be construed to refer to a process or set of processes that execute on one or more electronic devices, such as WWW server 200. Like a client, a server is not limited to running on a server computer. Rather, it may also execute on what would typically be considered a client computer, such as client computer 300 of FIG. 3, or be distributed among various electronic devices, wherein each device might contain one or more processes or routines that together constitute a server application. Where appropriate, server should be construed, in addition or in lieu of the discussion above, to be a device upon which one or more server processes execute, for example, server 200 or client computer 300.

Encryption and Decryption

Throughout this disclosure, references to encryption and decryption are made. Where appropriate, each reference to an algorithm used to perform encryption or decryption should be construed to include any other algorithm or technique for making it more difficult to obtain the original bytes (also called plaintext) of an application, component of an application, and/or data. For each reference to an algorithm used to perform encryption or decryption throughout this disclosure, it should also be recognized that other embodiments of the invention may be implemented using other encryption algorithms, including the proposed Advanced Encryption Standard (AES) which is Rijndael, RSA Labs Inc.'s (hereinafter "RSA's") RC6, IBM's MARS, TwoFish, Serpent, CAST-256, International Data Encryption Algorithm (IDEA), Data Encryption Standard (DES), Triple DES, DES-EDE2, DES-EDE3, DESX, DES-XEX3, RC2, RC5, Blowfish, Diamon2, TEA, SAFER, 3-WAY, GOST, SHARK, CAST-128, Square, Skipjack, Panama, ARC4, SEAL, WAKE, Sapphire II, Blum-BlumShub, RSA, DSA, ElGamal, Nyberg-Rueppel (NR), BlumGoldwasser, Rabin, Rabin-Williams (RW), LUC, LUCELG, ECDSA, ECNR, ECIES, ECDHC, ECMQVC, and/or any other encryption algorithm. These encryption algorithms may use, where appropriate, cipher block chaining mode, cipher feedback mode, CBC ciphertext stealing (CTS), CFB, OFB, counter mode, and/or any other block mode. Other exemplary "encryption" techniques that may be used by embodiments of the invention include compiling source code into binary code, and/or using proprietary data structures to send data. In one embodiment of the invention, Crypto++ v4.x, an open-source class library of cryptographic techniques, the source code of which is hereby incorporated by reference, may be used in encrypting or decrypting applications and/or data. Other encryption and decryption libraries, both open source, commercial, and/or proprietary may be used without departing from the spirit or scope of the invention.

In one embodiment of the invention, for symmetric encryption and decryption 128-bit keys and the proposed-AES Rjindael cipher may be used in cipher block chaining mode. Random initialization vectors (IVs) may be sent in plaintext. In another embodiment to protect a password stored on a client, 256-bit Rjindael in cipher feedback mode is used with a random IV. In other embodiments of the invention, other symmetric encryption algorithms (such as the ones listed in the previous paragraph) may be used for symmetric encryption and decryption.

In one embodiment of the invention, for asymmetric encryption, 1024-bit keys may be used with RSA. These keys may be formatted according to the "OAEP (with SHA1)" scheme provided by RSA, or any other formatting appropriate. For example, RSA may be used in conjunction with a ticket (which is described in more detail below) to decrypt data in the ticket to recover an AES key that may then be used to decrypt other portions of a ticket. SHA1 stands for secure hash algorithm 1. SHA1 is a cryptographic hash algorithm that produces a 160-bit hash value from an arbitrary length string. In other embodiments of the invention other private key/public key encryption algorithms may be used (such as the ones listed above) with the same or different key sizes.

In another embodiment of the invention, a server and/or client may also employ a 128-bit HMAC (hashed message authentication code) and/or 1024-bit RSA digital signatures to assist in authenticating that the contents of a ticket have not been changed and/or in authenticating a client and/or server. The 128-bit HMAC may use SHA1 to create a digest of data. For example, contents of a ticket may be fed into a one way hashing function, such as SHA1, to create a block of binary digits. The hashing function may be such that whatever is inputted into it is hashed into fixed length of bits. For example, the hashing function may return 160 bits whether it operates on 4 bytes of data or on all the text in the Bible. A RSA signature may be created and/or formatted as described in RSA's PKCS #1 v2.0, or any other suitable format.

Encryption may be used to protect tickets in a somewhat similar fashion to the Kerberos open protocol from the Massachusetts Institute of Technology (MIT), which is hereby incorporated by reference. Embodiments of the invention that may be used to protect tickets and authenticate clients and/or servers are described below.

Keys may be distributed using 1024-bit RSA and a 128-bit Rjindael symmetric session key. The 1024-bit RSA key may be used to encrypt the 128-bit Rjindael symmetric key. The 128-bit Rjindael key may be used to encrypt the body of a message. To recover a message body, a receiver may use its private RSA key to obtain the 128-bit Rjindael key. Then the 128-bit Rjindael key may be used to decrypt the body of the message. Tickets may include other encrypted 128-bit Rjindael session keys that are sent from one server to another server in a somewhat similar manner to that described in the open Kerberos protocol from MIT.

Encrypted or unencrypted messages or tickets may be sent using TCP/IP, UDP, SSL, IPSEC, or any other networking protocol. Content sent to or from content servers may be encrypted on unencrypted. Random numbers may be generated by any random number generator. An exemplary random number generator that may be used is CryptoAPI, produced by Microsoft Corporation of Redmond, Wash.

It will be recognized that the key sizes given above are illustrative. In other embodiments of the invention, key sizes other than or in addition to the key sizes above may be used when encrypting data and/or authenticating a server, client, or user.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for granting access to a system and content, comprising:
   providing a key that is used by a client computer to validate access to the content comprising resources;
   displaying at the client computer information about the content, based on the validation of access to content enabled by the key, wherein at least one subset of the content is selected by a user at the client computer;
   based on the subset of content selected by the user of the client computer, delivering by a server, a separate authentication ticket to the user of the client computer for enabling an authentication of the user and a determination of at least one user right to receive at least one of a plurality of content tickets;
   employing an affirmative authentication of the user and the determination of the at least one user right to receive the at least one of a plurality of content tickets and to provide the at least one content ticket to the user for accessing at least a portion of the selected subset of content and a granting of access by the user to at least the portion of the subset of the content selected by the user for a defined period of time;
   using the at least one content ticket to enable at least the portion of the selected subset of the content to be downloaded onto the client computer, wherein the downloaded portion includes executable code blocks and data blocks, the executable code blocks being part of an application;
   executing some of the downloaded portion of executable code blocks on the client computer;
   modifying at least one downloaded block of executable code to modify execution of at least a portion of the application using the at least one downloaded block of data before all of the subset of selected content including additional executable code blocks is downloaded and available on the client computer; and
   if the defined period of time for at least one of the tickets associated with the portion of the at least one selected subset of the content is expired, degrading a performance of the modified application over time, while enabling execution of at least a portion of the modified application.

2. The method of claim 1, wherein the key is encoded onto at least one of a coupon, a computer display, a file on a computer, a file on a disk; mail, email, a business card, a receipt, a dongle, a USB-style plug, a compact flash memory card, a smart card, and a credit card.

3. The method of claim 2, wherein providing the key, further comprises, encoding the key from at least one of a magnetically encoded, a barcode encoded, and an ink encoded.

4. The method of claim 2, wherein the file on the computer is located locally and includes at least one of a cookie, a registry, and a database.

5. The method of claim 1, wherein the application includes a computer game.

6. The method of claim 1, wherein delivering the authentication ticket, further comprises storing the ticket locally and providing the ticket to the server before using the at least one content ticket to access on the client computer the portion of the content.

7. The method of claim 1, wherein the key is provided by a third-party to a customer, and the third-party is charged a fee based, at least in part, on an amount of content utilized by the modified application.

8. The method of claim 1, further comprising notifying the client computer of a time remaining before access to the content is terminated.

9. The method of claim 1, further comprising:
   associating the key with at least one of a smart card and a credit card; and
   retrieving the key upon identification of at least one of the smart card and the credit card.

10. The method of claim 1, further comprising:
    receiving within the portion of the content an advertisement associated with a third-party; and modifying the execution of the application to display the advertisement.

11. The method of claim 1, further comprising providing a user associated with the client computer a purchase option associated with the key, wherein the purchase option includes a rental fee that provides access to particular content for a period of time.

12. The method of claim 1, further comprising providing a user associated with the client computer a purchase option associated with the key, wherein the purchase option includes a subscription fee that may be based on resources used, a fixed fee, or a recurring fee.

13. The method of claim 1, wherein providing the key, further comprises providing the key from a third-party over a network.

14. The method of claim 1, wherein providing the key further comprises:
    providing the key to a customer by a third-party based at least in part on a purchase transaction of other than the portion of the content or the application by the customer; and
    associating the key to the customer.

15. The method of claim 1, wherein the information includes at least one of a type of the content, a price for the content and a length of time the content is accessible.

16. A system for granting access to content, comprising:
    a content server that provides content; and
    a client computer that employs a key for validation, an authentication ticket for authentication of a user, and at least one of a plurality of content tickets to enable the user to gain access to at least a portion of content selected by the user, the client computer including a process of downloading at least one resource that includes blocks of executable code of an application from the content server, while the client computer is executing the application using at least on the client computer an other portion of the application that includes other blocks of executable code, the client computer performing acts, comprising:
    displaying information about a set of resources, wherein the set of resources provided is based on a validation of the client computer that is enabled by the key;
    selecting at least one resource by the user at the client computer;
    receiving an authentication ticket based on the at least one selected resource, wherein the authentication ticket enables authentication of the user and enables the user to receive at least one of a plurality of content tickets;

receiving at least one of a plurality of content tickets based on the authorization ticket, wherein the at least one content ticket enables the user to gain access to at least a portion of the at least one selected resource for a defined period of time;

requesting the at least one selected resource based on the at least one content ticket;

providing the requested resource based at least on the at least one content ticket, wherein providing comprises providing the requested resource locally if the requested resource is located local on the client computer; and otherwise, downloading the requested resource from the content server and indicating that the downloaded resource is currently local on the client computer, wherein the downloaded resource includes at least one block of executable code and at least one block of data; and modifying the at least one downloaded block of executable code to modify the application using the at least one block of data before all of the at least selected portion of the content is available for access on the client computer;

receiving within the portion of the content an advertisement associated with a third-party; and displaying the advertisement while accessing the resource.

17. The system of claim 16, wherein the content includes a computer program and data associated with the computer program.

18. The system of claim 16, wherein the key is encoded onto at least one of a coupon, a computer display, a file on a computer, mail, email, a business card, a receipt, a dongle, a USB-style plug, a compact flash memory card, a smart card, and a credit card.

19. The system of claim 16, wherein the content server performs acts, comprising:

associating the key with a username and password; and providing the key upon receiving the username and password.

* * * * *

UNITED STATES PATENT AND TRADEMARK OFFICE
CERTIFICATE OF CORRECTION

| | | |
|---|---|---|
| PATENT NO. | : 8,108,687 B2 | Page 1 of 1 |
| APPLICATION NO. | : 10/317845 | |
| DATED | : January 31, 2012 | |
| INVENTOR(S) | : Richard Donald Ellis et al. | |

It is certified that error appears in the above-identified patent and that said Letters Patent is hereby corrected as shown below:

On the title page, item (56), under (Other Publications), in column 2, line 2, delete ""Wndows" and insert -- "Windows --, therefor.

In column 9, line 4, delete "AP1" and insert -- API --, therefor.

In column 14, line 3, delete "Rjindael" and insert -- Rijndael --, therefor.

In column 14, line 6, delete "Rjindael" and insert -- Rijndael --, therefor.

In column 14, line 46, delete "Rjindael" and insert -- Rijndael --, therefor.

In column 14, line 47, delete "Rjindael" and insert -- Rijndael --, therefor.

In column 14, line 48, delete "Rjindael" and insert -- Rijndael --, therefor.

In column 14, line 50, delete "Rjindael" and insert -- Rijndael --, therefor.

In column 14, line 51, delete "Rjindael" and insert -- Rijndael --, therefor.

In column 14, line 53, delete "Rjindael" and insert -- Rijndael --, therefor.

Signed and Sealed this
Eighth Day of May, 2012

David J. Kappos
*Director of the United States Patent and Trademark Office*